United States Patent [19]

Green

[11] 4,390,692

[45] Jun. 28, 1983

[54] TRIMETHYLSILYLATION OF CELLULOSE

[75] Inventor: John G. Green, Baton Rouge, La.

[73] Assignee: The Dow Chemical Company, Midland, Mich.

[21] Appl. No.: 390,455

[22] Filed: Jun. 21, 1982

[51] Int. Cl.³ ............................................ C08B 11/00
[52] U.S. Cl. ........................................ 536/84; 536/56
[58] Field of Search ..................................... 536/56, 84

[56] References Cited

U.S. PATENT DOCUMENTS

| 2,562,955 | 8/1951 | Schuyten et al. | 536/84 |
|---|---|---|---|
| 2,782,090 | 2/1957 | Robbart | 8/116 R |
| 2,824,778 | 2/1958 | Robbart | 8/116 R |
| 3,393,218 | 7/1968 | Wazer et al. | 556/412 |
| 3,418,312 | 12/1968 | Klebe | 536/56 |
| 3,418,313 | 12/1968 | Klebe | 536/56 |
| 3,432,488 | 3/1969 | Finkbeiner et al. | 536/56 |
| 4,337,095 | 6/1982 | Leoni et al. | 536/56 |

FOREIGN PATENT DOCUMENTS

| 364859 | 11/1981 | Austria | 15/05 |
|---|---|---|---|
| 364860 | 11/1981 | Austria | 15/05 |

*Primary Examiner*—Ronald W. Griffin
*Attorney, Agent, or Firm*—A. J. Young

[57] ABSTRACT

This invention provides a method for the preparation of trimethylsilyl cellulose ethers. The method comprises reacting cellulose with hexamethyldisilazane in the presence of a small amount of catalyst, wherein the catalyst is acetamide, acetamide and an ammonium halide, N,N-dimethylformamide and an ammonium halide, N,N-dimethylformamide and trimethylsilyl chloride, 2-oxazolidinone and an ammonium halide, or a mixture thereof.

11 Claims, No Drawings

TRIMETHYLSILYLATION OF CELLULOSE

BACKGROUND OF THE INVENTION

This invention relates to the preparation of trimethylsilyl cellulose ethers by the reaction of cellulose with hexamethyldisilazane.

Several methods are known for preparing organosilylated cellulose derivatives by reacting cellulose with a silazane in a solvent. However, most of these methods require large quantities of solvent to disperse the cellulose, which must thereafter be separated from the organosilylated cellulose product.

SUMMARY

In general, the present invention provides a method for the preparation of trimethylsilyl cellulose ethers, which comprises reacting cellulose with hexamethyldisilazane in the presence of a small quantity of catalyst, wherein the catalyst is acetamide, acetamide and an ammonium halide, N,N-dimethylformamide and an ammonium halide, N,N-dimethylformamide and trimethylsilyl chloride, 2-oxazolidinone and an ammonium halide, or a mixture thereof. A "small amount of catalyst" as herein defined is an amount less than the amount of hexamethyldisilazane reactant used on either a weight or mole basis.

It is an object of this invention to provide an improved method for preparing trimethylsilyl cellulose ethers. It is a further object of this invention to provide a process which is selective and can be carried out at reasonably moderate temperatures. It is a still further object of this invention to provide a process having greatly reduced solvent requirements, decreased reaction temperatures, increased yields of product based on the cellulose or increased percent silicon substitution in the product. It is also an object of this invention to provide a process capable of using cellulose having a moisture content of about two to four percent by weight rather than rigorously dried cellulose. Other objects of the invention will be apparent to those skilled in the art from the more detailed description which follows.

DESCRIPTION OF THE PREFERRED EMBODIMENTS

The following description illustrates the manner in which the principles of the present invention are applied, but it is not to be construed as in any sense limiting the scope of the invention.

In the preferred method of carrying out the present process, the reaction temperature is maintained between about 100° C. and about 135° C., and more preferably, between about 105° C. and about 115° C. At temperatures below 100° C. the reactions were found to be so slow that they were impractical and at temperatures about 135° C. the reactions were found to be very erratic with loss of conversion percentage.

In this process, cellulose is preferably reacted with hexamethyldisilazane in the presence of a catalytic amount N,N-dimethylformamide and an ammonium halide, preferably ammonium chloride. The amount of N,N-dimethylformamide used is preferably between about 0.07 and about 0.4 grams per gram of cellulose, and more preferably, between about 0.1 and about 0.2 grams per gram of cellulose. The mole ratio of hexamethyldisilazane to cellulose anhydroglucose units is preferably between about two to one and about four to one; the weight ratio of hexamethyldisilazane to N,N-dimethylformamide is preferably between about ten to one and about twenty to one; and the amount of ammonium chloride used is between about 0.05 and about 0.07 grams per gram of cellulose.

The invention is further illustrated by the following examples.

EXAMPLE 1

Two grams (twelve millimoles of anhydroglucose units) of cellulose containing between about one-half percent and about four percent water by weight was vigorously mixed with 0.1 gram (1.8 millimoles) of ammonium chloride crystals in a one-hundred-milliliter round-bottomed flask. A second mixture consisting of 6.2 grams (thirty-eight millimoles) of hexamethyldisilazane and 0.728 grams (9.1 millimoles) of N,N-dimethylformamide was added to the reaction flask with continuous mixing. The flask was fitted with a drying tube filled with calcium sulfate indicating dessicant and then heated in an oil bath without stirring for eight hours at 110° C.

The crude product was washed with acetone and dried in a vacuum-oven at 100° C. The dried product (4.22 grams) was dissolved in toluene, and reprecipitated by the addition of methanol, to obtain a white, fibrous product. The recrystallized product weighed 3.87 grams. X-ray analysis of the product indicated a degree of substitution of 2.19, equivalent to 19.2 percent silicon by weight added to the cellulose. Using the degree of substitution determined by X-ray analysis, the yield of the trimethylsilyl cellulose ether product was calculated to be ninety-eight percent of the theoretical yield, based on the cellulose charged to the reaction flask.

EXAMPLES 2-6

The procedure described for Example 1 was used in Examples 2-6. The conditions and results of each example are summarized in Table I, below. In each example, two grams (twelve millimoles of anhydroglucose units) of cellulose and 3.20 grams (thirty-eight millimoles) of hexamethyldisilazane were charged to the reaction flask in addition to the other reactants shown in the table. The reactions were run at 110° C. for two and one-half hours.

TABLE I

| Example No. | Acetamide (grams) | 2-Oxazolidinone (grams) | Ammonium Chloride (grams) | Product Silicon Content (weight percent) |
|---|---|---|---|---|
| 2 | 0.6 | None | None | 4.7 |
| 3 | 1.2 | None | None | 7.5 |
| 4 | 0.6 | None | 0.2 | 3.7 |
| 5 | 1.2 | None | 0.2 | 7.0 |
| 6 | None | 3.48 | 0.2 | a | a - No quantitative test. Presence of silicon qualitatively found by wetability in water.

EXAMPLES 7-9

The procedure described for Example 1 was followed for Examples 7 through 9. The conditions and results of each example are summarized in Table II, below. In each example, two grams (twelve millimoles of anhydroglucose units) of cellulose, 3.2 grams (twenty millimoles) of hexamethyldisilazane, and 0.15 grams (1.9 millimoles) of N,N-dimethylformamide, as well as the ammonium chloride shown in the table, were charged to the reaction flask.

TABLE II

| Example No. | Ammonium Chloride (grams) | Temperature (°C.) | Reaction Time (hours) | Product Silicon Content (weight percent) |
| --- | --- | --- | --- | --- |
| 7 | 0.1 | 100 | 12 | 16.4 |
| 8 | None | 120 | 23½ | None detected |
| 9 | 0.1 | 135 | 23 | 6.7 |

EXAMPLE 10

The procedure described for Example 1 was again used to carry out the reaction described in this example. Two grams (twelve millimoles of anhydroglucose units) of cellulose, 3.2 grams (19.8 millimoles) of hexamethyldisilazane, 0.32 grams (four millimoles) of N,N-dimethylformamide, and 0.086 grams (0.8 millimoles) of trimethylsilyl chloride were charged to the reaction flask. The reaction was conducted at 110° C. for two and one-half hours. The reaction product contained 17.1 percent silicon by weight.

While certain representative embodiments and details have been shown for the purpose of illustrating the present invention, it will be apparent to those skilled in the art that various changes and modifications can be made therein without departing from the spirit and scope of the invention.

What is claimed is:

1. A method for the preparation of trimethylsilyl cellulose ethers, which comprises reacting cellulose with hexamethyldisilazane in the presence of a small amount of catalyst, wherein the catalyst is acetamide, acetamide and an ammonium halide, N,N-dimethylformamide and an ammonium halide, N,N-dimethylformamide and trimethylsilyl chloride, 2-oxazolidinone and an ammonium halide, or a mixture thereof.

2. The method of claim 1, wherein the reaction is carried out between about 100° C. and about 135° C.

3. The method of claim 2, wherein the reaction is carried out between about 105° C. and about 115° C.

4. The method of claim 3, wherein the ammonium halide is ammonium chloride.

5. The method of claim 4, wherein the catalyst is N,N-dimethylformamide and ammonium chloride.

6. The method of claim 5, wherein the amount of N,N-dimethylformamide is between about 0.07 and about 0.4 grams per gram of cellulose.

7. The method of claim 6, wherein the amount of N,N-dimethylformamide is between about 0.1 and about 0.2 grams per gram of cellulose.

8. The method of claim 7, wherein the amount of ammonium chloride is between about 0.05 and about 0.1 grams per gram of cellulose.

9. The method of claim 8, wherein the amount of ammonium chloride is between about 0.05 and about 0.07 grams per gram of cellulose.

10. The method of claim 9, wherein the weight ratio of hexamethyldisilazane to N,N-dimethylformamide is between about ten to one and about twenty to one.

11. The method of claim 10, wherein the mole ratio of hexamethyldisilazane to cellulose anhydroglucose units is between about two to one and about four to one.